May 24, 1960
C. E. SMITH
2,937,612
WAVE MOTOR FOR PROPULSION OF SHIPS
Filed July 23, 1956
2 Sheets-Sheet 1
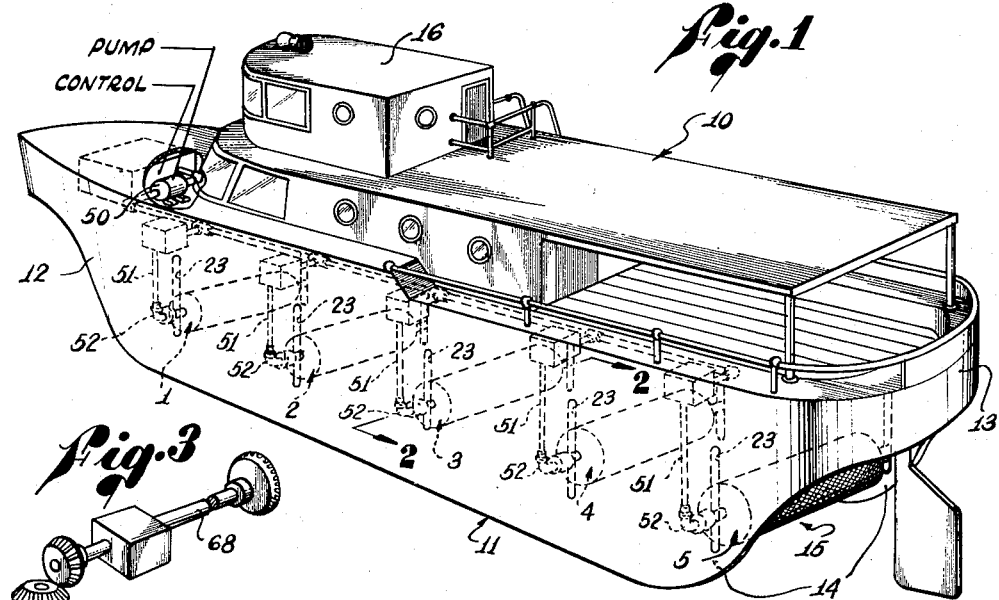
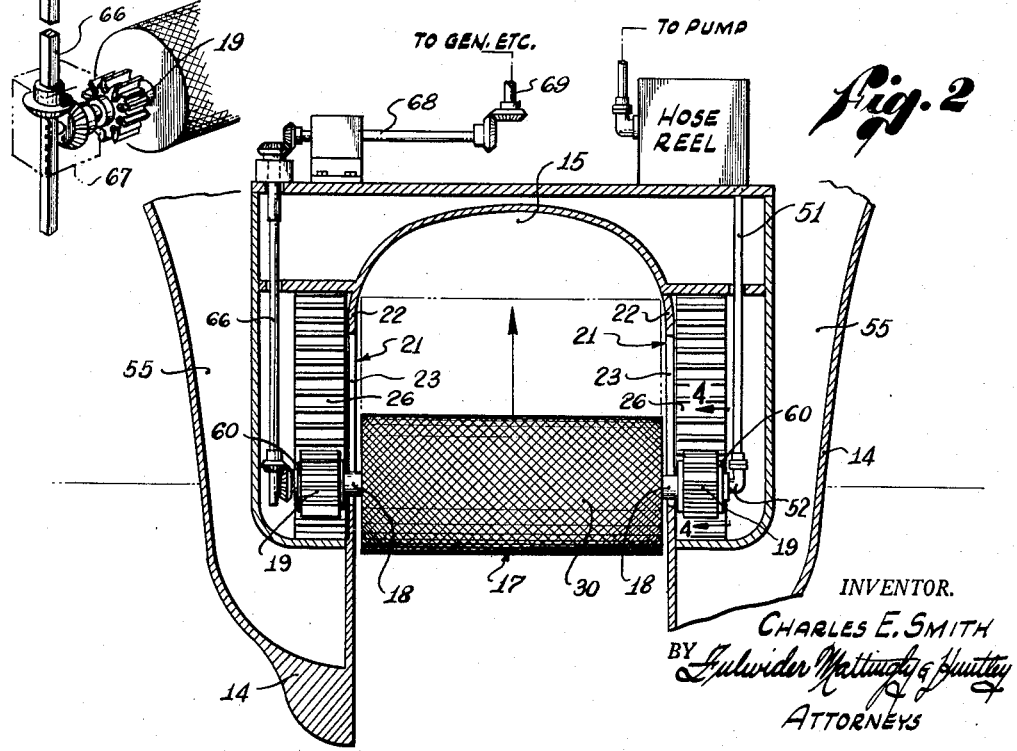
INVENTOR.
CHARLES E. SMITH
BY
ATTORNEYS May 24, 1960
C. E. SMITH
2,937,612
WAVE MOTOR FOR PROPULSION OF SHIPS
Filed July 23, 1956
2 Sheets-Sheet 2
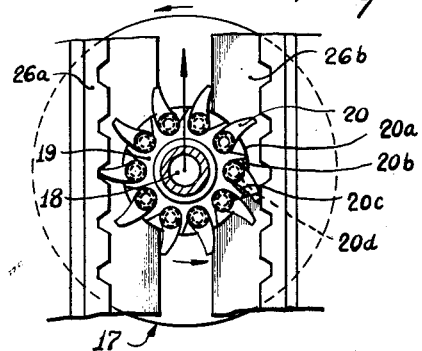
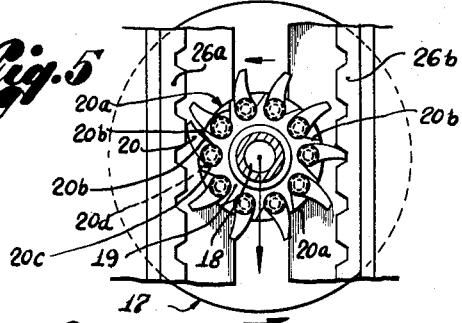
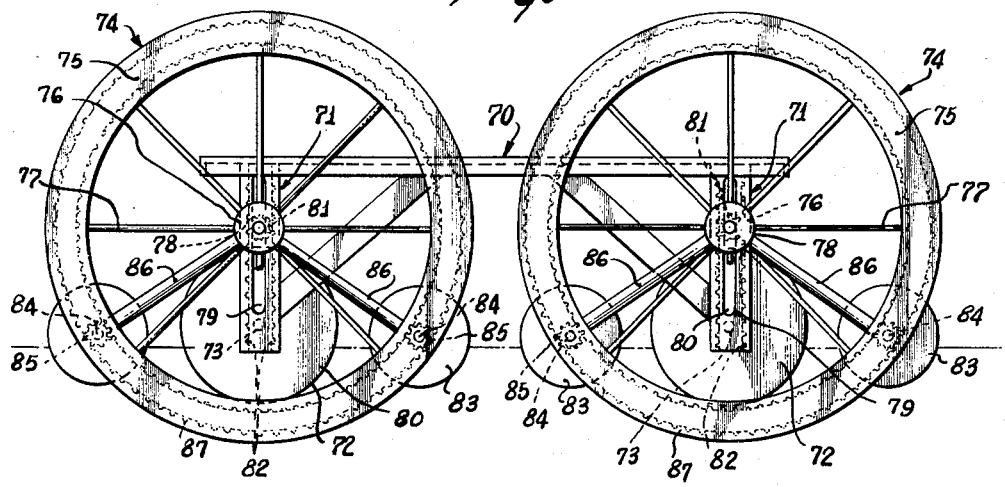
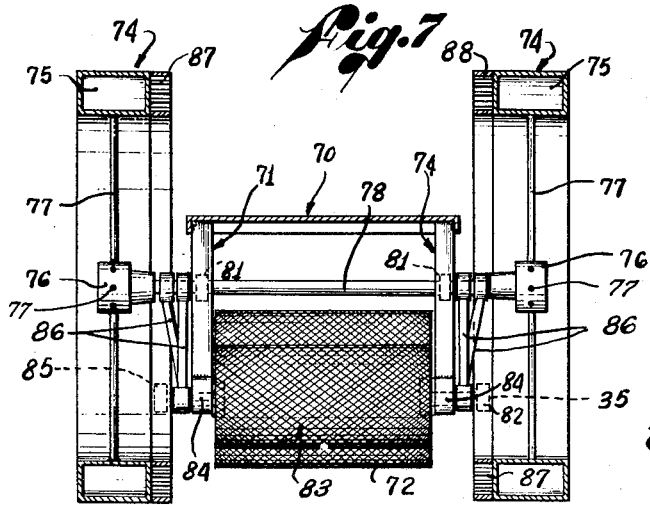
INVENTOR.
CHARLES E. SMITH
BY
ATTORNEYS though man has long been aware of the great potential source of power which exists in the waves of the ocean and many systems and devices have been proposed to harness this power, none of these has been truly effective.

United States Patent Office 2,937,612
Patented May 24, 1960

2,937,612
WAVE MOTOR FOR PROPULSION OF SHIPS
Charles E. Smith, 1030 S. Paula Drive, Fullerton, Calif.
Filed July 23, 1956, Ser. No. 599,572
14 Claims. (Cl. 115—4)

My invention relates in general to means for harnessing the power of the sea and more particularly to an improved type of wave motor for propelling ships or providing power for other equipment associated with or located near large bodies of water.

Though man has long been aware of the great potential source of power which exists in the waves of the ocean and many systems and devices have been proposed to harness this power, none of these has been truly effective.

Any device which is to provide a good source of power from the waves must be able to adapt to a wide variation of wave conditions and still give an output torque and speed which are readily convertible into useful work. Furthermore, the device must not be so complex in its construction nor so difficult to operate or maintain that the resultant savings in fuel do not justify its expense.

My invention satisfies these requirements and has other advantages as well. It consists in essence of a cylindrical float so mounted that either upward or downward movement causes it to rotate in the same direction. When used to propel a ship, the outer surface of the float is honeycombed so that it grips the water. The waves move the float up and down and as it rotates, it delivers propulsive power to the ship.

By varying the ballest in the float and providing clutching, reversing, and ratio-changing apparatus in the rotation mechanism, my device will produce power at a useful torque and speed from many different wave conditions. Also, since the float is both the power converter and propelling means, my invention is quite simple to construct and operate.

Furthermore, my floats provide part of the ship's buoyancy and since they are rotating to propel the ship, the drag present in ships with the usual type hull is greatly reduced in ships using my device.

As will be readily appreciated, my invention can be used in many different embodiments and for a great diversity of purposes. It may be used to propel ships, to provide auxiliary power for ships, or to provide power for equipment located near large bodies of water. It could be used to generate electric power, pump oil from wells, or provide power for seaborne radar stations.

It is therefore a major object of my invention to provide a means for harnessing the power of the sea which is simple, effective, and puts out power at a useful torque and speed.

It is another object of my invention to provide a wave motor for propelling ships in which the power converter and propulsion means are one and the same member.

It is also an object of my invention to provide a wave motor which utilizes a floating cylinder capable of both rotary, and up and down movement.

It is a further object of my invention to provide a wave motor which when utilized for propelling ships, allows a hull construction which minimizes drag.

These and other objects and advantages of my invention will become apparent from the following detailed description of some presently preferred forms thereof, and from an inspection of the accompanying drawings, in which:

Figure 1 shows a perspective view of one embodiment of my invention mounted in a ship having a split hull;

Figure 2 is a sectional end view of the embodiment shown in Figure 1;

Figure 3 is a perspective view of the auxiliary power system used in my invention;

Figure 4 is a detailed view of my one-way rotation gear showing the action of its hinged teeth when it is moved upward with respect to the rack gears;

Figure 5 is a view similar to Figure 4 showing the action of the hinged teeth when the gear is moved downward;

Figure 6 is a side elevation of a second embodiment of my invention; and

Figure 7 is a sectional end view of the embodiment shown in Figure 6.

Referring now to the drawings, and particularly to Figures 1, 2 and 3 thereof, the numeral 10 designates a ship having a hull 11 of the type commonly known as a split hull. The hull has a bow 12, a stern 13 and side legs 14, the lower ends of which extend into the water to support the ship. The side legs 14 form a tunnel 15 which extends through the center of the hull from the bow to the stern. The ship may be equipped with any desired superstructure 16.

To propel the ship, a plurality of floats 17 are disposed in the tunnel 15 with their longitudinal axes perpendicular to the centerline of the hull. The floats 17 have axles 18 extending from each end along their longitudinal axes. Pinion gears 19 are mounted on each of the axles 18 affixed thereto so that when the gears are turned, the floats will be rotated. The pinion gears 19 have hinged teeth 20 pivotally secured adjacent their circumference, which pivot from an open, engaging position projecting radially from the circumference to a closed, nonengaging position more nearly tangent to the circumference. The teeth 20 are mounted in V shaped recesses 20a in the body of the gears which provide limiting shoulders 20b and 20c at the extremities of their pivotal movement.

A coil spring 20d is provided between each of the hinged teeth and the gear body to hold the teeth in their open position against the limiting shoulder 20b. If force is applied to the teeth substantially tangent to the circumference of the gear and in the same direction as the spring force the teeth will remain rigid because they are abutted against the limiting shoulder 20b. However, if a force sufficient to overcome the pressure of springs 20d is applied in a like manner in the opposite direction the teeth will pivot against the pressure of the springs 20d until they reach their closed position, abutted against the limiting shoulder 20c. Because of this action of the hinged teeth 20 the gears 19 may be rotated in only one direction. This facility of the pinion gear is used in my wave motor to provide unidirectional rotation from a reciprocating movement, as will be explained later.

To attach the floats 17 to the hull, vertically disposed channels 21 are provided. These channels 21 are located in the tunnel 15 on the side legs 14 and are designed to receive the axles 18 and pinion gears 19. The channels 21 have guides 22 with bearing surfaces 23 which engage the axles to hold the floats in proper lateral alignment.

Each of these channels 21 has rack gears 26 on its fore and aft sides which engage the hinged teeth 20 of the associated pinion gear 19 when the gear is moved relative to the racks. Therefore, when a float 17 is forced upward by a wave, the hinged teeth 20 on the forward part of the pinion gear engage the forward rack gear 26a in such a way that the teeth maintain their open engaging position and are locked there, causing the pinion gear and float to be rotated counterclockwise (see Figure 4). Simultaneously, the hinged teeth on the after part of the pinion gear 19 engage the after rack gear 26b but in such a manner that they are forced temporarily into their closed, non-engaging position and therefore do not block the counterclockwise rotation of the pinion gears.

After the wave has passed and gravity forces the cylinder downward, the reverse takes place (see Figure 5). The hinged teeth on the after part of the pinion gear engage the after rack gear 26b in their open, engaging position and continue to rotate the float counterclockwise, while the hinged teeth on the forward part of the pinion gear now engage the forward rack gear 26a such that they are forced to their closed, non-engaging position and do not block the continuing counterclockwise rotation.

Thus either upward or downward movement of the float causes it to rotate continuously in the same direction.

I therefore provide in my invention a simple and yet very satisfactory method for producing a continuous unidirectional rotation from a reciprocating movement.

Since the floats may be subjected to axial forces as well as radial forces, I also provide thrust bearings between the axles and the channels.

In order to transfer power from the cylindrical floats 17 to the water when the floats are rotated, a honeycombed outer surface 30 is provided on the floats. This surface has a plurality of small compartments separated by baffles which act similarly to the paddles of a waterwheel and cause the floats to grip the water as they are rotated.

To aid in explaining the operation of my wave motor, it is convenient to number the floats consecutively from the bow to the stern. This I have done in Figure 1. The operation may then be most readily understood by considering first a wave or swell which moves past the ship from bow to stern. When such a wave first meets the ship, it encounters the bow and float number 1. Since float 1 represents considerably less mass than the bow, the lifting force of the wave urges it upward with respect to the hull. As described above, this upward movement, translated through the pinion gears 19 and rack gears 26, causes the float to rotate counterclockwise (as viewed in Figure 1). Since the outer surface of the float is honeycombed, its grips the water during this rotation and supplies propulsive power to the ship.

As the crest of the wave passes float 1, gravity urges the float downward. This force is also translated into a counterclockwise rotation of the float, as explained above, and the resultant propulsive power to the ship is continued.

The wave next reaches float 2 and causes it to move upward and downward in the same manner as float 1. Again, this movement is translated into a counterclockwise rotation of the float and applies an added propulsion to the ship.

As the wave encounters floats 3, 4 and 5, the result is the same. It is readily apparent, therefore, that if a series of waves or swells meets and passes the ship from bow to stern, the floats will soon all be moving up and down with respect to the hull, and as a consequence all rotating continuously in the same direction, supplying power to propel the ship.

If the waves or swells approach the ship from the stern or from the side, rather than from the bow, the result is still substantially the same. As long as the waves move relative to the ship, and the weight relationship between the hull and the floats is such that they respond differently to the lifting force of the waves and thus move relative to each other, the wave motor will supply propulsive power to the ship.

Understanding the functioning of my invention, it will be apparent that since the relative densities of the hull and floats affect their movement with respect to each other, varying this density relationship will affect the output of the wave motor. If, for instance, the floats have very small density compared to the hull, the waves will act upon the floats as if the hull were stationary, causing considerable movement between the floats and hull and producing much propulsive power. On the other hand, if the floats are nearly the same density as the hull, the waves will act upon both with approximately the same effect, and their relative movement and resultant propulsive power will be much less.

It will also be understood from a knowledge of fundamentals of mechanics that the density of the floats will be a determinant in the character of their response to the waves.

If a particular float is made heavier, that is, of increased density, the inertia of its increased mass will slow its response to the uplifting force of the waves. If the uplifting wave is a small one, it may pass the float without lifting it at all, just as a ripple passes a large ship. If the wave is quite large, however, it may apply sufficient force to lift the denser float to its uppermost limit along with the other floats, and since the float is heavier, more foot pounds of work will be contributed to propel the ship as it is drawn back down by gravity.

On the other hand, if a particular float is made lighter, that is, of less density, it will respond more quickly than the others and may be lifted even by small waves which are not large enough to lift the other floats. It will not, however, contribute as great a force in foot pounds of work per cycle for propelling the ship as the other heavier floats.

It will be readily seen from this discussion that the conditions of the sea will determine whether a float of greater or less density will be most effective for driving the ship.

If, for instance, the sea is choppy, that is, the waves are close together but have a relatively shallow crest, the float of less density will be the most effective. This float will respond quickly to the force of the waves and will therefore be moved rapidly up and down by the many small waves. If, however, the sea is rough, that is, consists of well separated waves having very high crests, the float with the greater density will be more effective, since, although it will take the wave longer to drive the float to its maximum upward position, the float will contribute more driving force to the ship as it falls, due to its greater weight.

So by controlling both the relative densities of the hull and floats and the density of the floats themselves, my wave motor may be adapted to many different wave conditions to produce an effective source of power for the ship.

To achieve this density control in my invention, I provide a ballast control system which consists of a pump 50 having a plurality of flexible hose headers 51 connected to the floats through couplings 52 which allow for a rotating connection.

The system also has a plurality of headers (not shown) which are connected to separate ballast tanks 55 in the side legs 14 of the hull. A sea water header (not shown) is also provided to allow water to be drawn from or discharged into the sea. To interconnect the various headers to each other and to the pump 50, a control center of any suitable construction is provided.

With this system, water may be pumped between the floats 17 and the side leg ballast tanks 55 to vary the density relationship between the floats and the hull, and into or out of any of the floats individually to increase or decrease their weight and density as desired. The water used in this system may be either fresh water carried in the side leg ballast tanks 55, or may be sea water drawn from the ocean through the sea water header.

As another means for increasing the adaptability of my wave motor, I mount a variable ratio power transmission 60 between the pinion gears 19 and the axles 18. The transmissions 60 are controlled through flexible cables and allow the rotational speed of the floats to be varied for any given rate of up and down movement. This provides a means whereby, for any particular wave conditions, the rotational speed of my floats may be regulated to vary the ship's speed or to obtain a speed of rotation which gives optimum gripping action between the floats and the water. My transmissions are also equipped with a free-wheeling arrangement so that if the passing water should for any reason drive a float faster than it is presently being driven by the rack and pinion gears, the float will turn free of the pinion gears and not drag.

Furthermore, I provide my transmission with a reverse and a neutral, so that if desired, the floats may be either caused to rotate in the opposite direction (clockwise in Figure 1) to move the ship astern, or allowed to turn free of the pinion gears 19.

To further add to the versatility of my wave motor as a power source, I also provide an auxiliary power system 65 (see Figure 3). This system consists of drive shafts 66 disposed vertically in the side legs of the hull which have a sliding gear box 67 mounted thereon. The gear box is attached to the axle 18 of each float and slides up and down on the drive shaft 66 as the float moves in its channels. The sliding connection between the gear box and drive shaft is such that the shaft is turned as the float and axle are rotated. The gear box also contains a neutral position, so that a disconnection can be effected between the axle and drive shaft, and ratio-changing gears to vary the speed of the drive shaft. At its upper end the drive shaft is geared to an athwart ship shaft 68 which connects to the main shaft 69 which extends fore and aft from the engine room.

When the sea is proper for effective operation of my wave motor, the auxiliary power system, as well as the ship itself, receives its power from the floats, and this power is taken from the system for auxiliary uses throughout the ship. Conversely, when the sea is still, an auxiliary engine may be connected to the main shaft 69 and used to propel the ship through the floats.

Another advantageous feature of my wave motor will be noted from the fact that the complete center portion of the hull in this embodiment consists of floats which are rotating when the ship is under way. This means that a considerable amount of the ship's surface which is in contact with the water is rotating with the water and causes practically no drag. Therefore, much of the hull drag incident to the usual type of ship is eliminated.

The second embodiment of my invention is shown in Figures 6 and 7. The fundamental operation of this embodiment is the same as that disclosed in my description of the first embodiment. In this second embodiment, however, I show that other novel features may be achieved by variations in the use of my basic idea, such as a different hull and float design and a speed differential made possible by interconnection of the floats. Also, all of the surfaces contacting the water in this embodiment are rotating with it so that the hull offers only a very minimum of resistance to the water through drag.

Referring now to Figure 6, the numeral 70 designates a platform having four vertically disposed legs 71. The platform 70 is buoyantly supported by cylindrical center floats 72 having axles 73 which are rotatably mounted in the lower portions of the legs 71. This allows the floats to rotate freely when propelled through the water thus minimizing their drag.

Also attached to the legs 71 are four buoyant wheels 74, each of which consists of a hollow toroidal outer portion 75 designed to give the float buoyance and a hub 76 supported at the center of the toroid by spokes 77. The wheels are mounted in pairs on axles 78 which are, in turn, slidably mounted between pairs of the legs 71 in vertically disposed grooves 79. The grooves 79 have bearing surfaces 80 in contact with axles 78 so that the axles are free to slide vertically in the grooves and rotate. Thus, the pairs of buoyant wheels 74 can move up and down and rotate with respect to the platform 70.

To provide the means for converting the up and down movement of the wheels caused by the waves, as explained in the description of my first embodiment, into unidirectional rotation, pinion gears 81 are mounted on the axles 78 adjacent the insides of the legs 71. Rack gears 82 are attached to the legs to engage the pinion gears. Thus, when waves force the wheels 74 up and down with respect to the platform, they are caused to rotate in the same manner as the floats in the first embodiment.

To furnish additional driving power at a different speed, two outrigger floats 83 are provided between each of the pairs of wheels, one forward and one aft. These outrigger floats are cylindrical and have axles 84 extending from each end, the same as the floats of my first embodiment.

The floats have pinion gears 85 attached to each axle and are positioned with their longitudinal axes adjacent the toroidal outer portion 75 of the wheels by two outrigger arms 86. These arms are pivotally attached to the axle 78 of the associated pair of wheels at one end and to the axle 84 of the outrigger floats at the other.

To cause rotation of the outrigger floats, outrigger rack gears 87 are provided which engage the drive gears 85 when the floats are moved up and down. These rack gears 87 are circular instead of linear and are attached to the inner side of the toroids of each of the buoyant wheels.

Since the wheels 74 contain the rack gears 87 of the outrigger floats, and they themselves rotate during operation of the wave motor, the outrigger floats when moved up and down by the waves will rotate at a different speed during the up movement than during the down movement. When an outrigger float is moving against the direction of rotation of its associated wheels and outrigger rack gears, it will rotate at a greater speed, and when it is moving in the same direction it will rotate at a lesser speed. It also follows that the foreward outrigger float will rotate at its greater speed when it is being moved upward and the aft outrigger float will move at its greater speed when it is being moved downward.

The floats and wheels in this embodiment, like those in the first embodiment, are equipped with transmissions between the pinion gears and axles. Therefore the outrigger floats and wheels will turn free if the water drives them faster than the gearing.

The outer surfaces of all the wheels and floats in this embodiment are honeycombed, as described in the first embodiment, so that the floats grip the water during rotation.

The floats in this second embodiment are also provided with means for changing their ballast (not shown) so that the weight relationship between the center floats supporting the platform and the outrigger floats and wheels or the individual densities of the outrigger floats and wheels may be varied to adapt the wave motor to different wave conditions.

This arrangement wherein the outrigger floats are made to rotate at a greater speed than the buoyant wheels, allows a further adaptation of the wave motor to wave conditions, since at certain speeds, the honeycombed surfaces grip the water more effectively than at other speeds. By changing ballasts, the portion of the driving power being delivered by the wheels or the outrigger floats may be varied. It is therefore possible in this embodiment to deliver some of the driving power at one speed and some at another. Thus, an even more effective use of the energy of the waves is achieved.

It will also be seen that the floats and wheels in this embodiment may be provided with thrust bearings to absorb axial thrust.

As previously suggested herein, my invention may also be used as a source of power for stationary equipment situated in or near large bodies of water. Perhaps the simplest embodiment for such a use would be a structure similar to my above-described first embodiment. By anchoring the rack gears 26 of this embodiment to the ocean bottom and providing the cylindrical floats 17 with a smooth rather than a honeycombed outer surface, the floats will rotate freely in the water as they are forced up and down by the waves. Power can then be taken from the rotating floats through a system such as my auxiliary power system.

From this description of several embodiments of my wave motor it will be seen that many uses and variations are possible. Therefore, while the forms shown and described are fully capable of achieving the objects and providing the advantages herein stated, it is to be understood that they are primarily illustrative of presently preferred embodiments of my invention, and that I do not mean to limit myself to the particular details shown other than as defined in the appended claims.

I claim:

1. A device for harnessing kinetic energy of waves in a liquid, comprising: a first member associated with said liquid; a second buoyant member operatively associated with said first member and capable of reciprocating movement with respect thereto when activated by said waves; rack and pinion gears cooperatively mounted on said first and second members for causing rotation of said second member when said members are reciprocated with respect to each other, said rack and pinion gears being adapted to rotate said second member continuously in the same direction; and means rotatable with said second member for transmitting the force of said rotation to said liquid to supply propulsive power to said second member.

2. A device for harnessing the power of the waves present on the surface of large bodies of water, comprising: a buoyant hull; a float operatively associated with said hull and capable of moving up and down with respect thereto when activated by said waves; a vertically disposed rack gear mounted on said hull adjacent said float; an axle secured to said float and projecting therefrom; a pinion gear mounted on said axle, said pinion gear being positioned in engagement with said rack gear for rotation thereby when said float is moved up and down thus converting said up and down movement to rotation; means associated with said pinion and rack gears for causing said float to rotate in the same direction for both up and down movement; variable ratio power transmission means connected between said pinion gear and said axle to provide for variation in the rotational speed of said float for any given rate of up and down movement and to allow said float to turn free from said pinion gear when desired; and paddle means on the outer surface of said float for transmitting the force of said rotation to said water to supply propulsive power for said hull.

3. A device for harnessing the power of the waves present on the surface of large bodies of water, comprising: a buoyant hull; a float operatively associated with said hull and capable of moving up and down with respect thereto when activated by said waves; a vertically disposed rack gear mounted on said hull adjacent said float; an axle secured to said float and projecting therefrom; a pinion gear mounted on said axle, said pinion gear being positioned in engagement with said rack gear for rotation thereby when said float is moved up and down thus converting said up and down movement to rotation; means associated with said pinion and rack gears for causing said float to rotate in the same direction for both up and down movement; variable ratio power transmission means connected between said pinion gear and said axle to provide for variation in the rotational speed of said float for any given rate of up and down movement and to allow said float to turn free from said pinion gear when desired; paddle means on the outer surface of said float for transmitting the force of said rotation to said water to supply propulsive power for said device; water tanks in said hull and float for receiving and dispensing water to change the relative densities thereof and thereby provide means for obtaining optimum performance of said device for any particular condition of said waves; means for filling and emptying water in said tanks; and an auxiliary power system capable of receiving power from said float for purposes other than propulsion and delivering power to said floats from an auxiliary engine when necessary.

4. A device for harnessing the power of the waves present on the surface of large bodies of water for propelling a ship, comprising: a float operatively associated with said ship and capable of up and down movement with respect thereto when activated by said waves; a pair of vertically disposed rack gears mounted in face-to-face relationship on said ship adjacent said float; a pinion gear connected to said float and disposed between said pair of rack gears with said rack gears juxtaposed on opposite sides of the circumference of said pinion gear, said pinion gear having hinged teeth capable of being engaged for rotation of said pinion gear only in one direction thereby causing said pinion gear to be engaged by only the rack gear on one side and thereby to be rotated in one direction when said float moves upward and to be engaged by only the rack gear on the opposite side and thereby to be rotated in the same direction when said float moves downward; and water gripping means on said float for transmitting the energy of said rotation to said water to supply propulsive power to said ship.

5. A device for harnessing the power of the waves present on the surface of large bodies of water, comprising: a buoyant hull having a longitudinally disposed tunnel extending centrally thereof from bow to stern; a plurality of cylindrical floats laterally disposed in said tunnel with their longitudinal axes substantially horizontal, said floats being attached to said hull for up and down movement with respect thereto when activated by said waves; axles projecting from each end of said floats along their longitudinal axes; pairs of vertically disposed rack gears attached to said hull in face-to-face relationship adjacent the ends of said floats; pinion gears mounted on said axles and disposed between said pairs of rack gears with said rack gears juxtaposed on opposite sides of the circumference of said pinion gears, said pinion gears having hinged teeth capable of being engaged for rotation only in one direction thereby causing said pinion gears to be engaged by only the rack gear on one side and thereby to be rotated in one direction when said floats move upward and to be engaged by only the rack gear on the opposite side and thereby to be rotated in the same direction when said floats move downward; variable ratio power transmission means connected between said pinion gears and said axles to allow variation in the rotational speed of said floats for any given rate of up and down movement and to allow said floats to turn free from said pinion gears when desired; water gripping means on the outer surface of said cylindrical floats for engaging said water when said floats are rotated thereby providing propulsive power for said device; water tanks in said hull and floats for receiving and dispensing water thereby providing means for regulating the relative densities of said hull and floats for obtaining optimum performance of said device for any particular condition of said waves; means for filling and emptying water in said tanks; and an auxiliary power system capable of receiving power from said floats for purposes other than propulsion and for delivering power to said floats from an auxiliary engine when necessary.

6. A device for harnessing kinetic energy in a fluid comprising: a first member associated with said fluid; a second member associated with said fluid, said second member being operatively associated with said first member and capable of movement with respect thereto when activated by motion of said fluid; means cooperatively interconnecting said first and second members for converting said movement into rotation of said second member; a third member associated with said fluid, said third member being operatively associated with said second member and capable of movement with respect thereto when activated by the motion of said fluid; means cooperatively interconnecting said second and third members for converting said movement of said third member and said rotation of said second member into rotation of said third member; and means on one of said second and third members for utilizing the energy of said rotation thereof.

7. A device for harnessing the power of the waves present on the surface of large bodies of water comprising: a buoyant hull; a pair of buoyant wheels connected by an axle, said wheels and axle being operatively associated with said hull and capable of up and down movement with respect thereto when activated by said waves; means cooperatively interconnecting said hull and wheels for converting said up and down movement of said wheels and axle into unidirectional rotation of said wheels; an outrigger float operatively associated with said wheels and capable of up and down movement with respect thereto when activated by said waves; means for cooperatively interconnecting said outrigger float and wheels converting said up and down movement of said outrigger float and said rotation of said wheels into unidirectional rotation of said outrigger float; and water gripping means on said wheels and float for engaging said water when said wheels and float are rotated as aforesaid, thereby providing propulsive power for said device.

8. A device for harnessing the power of the waves present on the surface of large bodies of water comprising: a buoyant hull; a pair of buoyant wheels connected by an axle, said wheels and axle being operatively associated with said hull and capable of up and down movement with respect thereto when activated by said waves; a pair of rack gears mounted on said hull; a pinion gear mounted on said axle and positioned in engagement with said rack gears, said pinion and rack gears being adapted to convert said up and down movement of said wheels into unidirectional rotation thereof; an outrigger float operatively associated with said pair of wheels and disposed therebetween for up and down movement with respect thereto when activated by said waves; a pair of circular rack gears mounted on said wheels; a pinion gear connected to said outrigger float and positioned in engagement with said circular rack gears, said circular rack gears and outrigger pinion gear being adapted to convert said up and down movement of said outrigger float and said unidirectional rotation of said wheels into variable speed unidirectional rotation of said outrigger float; and paddle means on the outer surfaces of said wheels and float for gripping said water when said wheels and float are rotated thus providing propulsive power for said device.

9. A device as specified in claim 7 which includes water tanks in said wheels, float and hull for receiving and dispensing water to change the relative densities thereof; means for filling and emptying water in said tanks; and an auxiliary power system capable of receiving power from said wheels and float for purposes other than propulsion and delivering power to said float and wheels from an auxiliary engine when necessary.

10. A device for harnessing the power of the waves present on the surface of large bodies of water comprising: a hull buoyantly supported by laterally disposed freely rotating cylindrical floats; a plurality of buoyant wheels connected in pairs by axles, said wheels being operatively associated with said hull and capable of up and down movement with respect thereto in response to said waves; pairs of vertically disposed rack gears mounted in face-to-face relationship on said hull adjacent said wheels; pinion gears mounted on said axles and positioned for engagement between said pairs of rack gears with said rack gears juxtaposed on opposite sides of the circumference of said pinion gears, said pinion gears having hinged teeth capable of being engaged for rotation of said pinion gears only in one direction, thereby causing said pinion gears to be engaged by only the rack gear on one side and to be rotated in one direction thereby when said floats move upward and to be engaged by only the rack gear on the opposite side and to be rotated in the same direction thereby when said floats move downward; outrigger floats operatively associated with said pairs of wheels which have axles secured thereto and projecting therefrom; outrigger arms pivotally attached to said wheel axles and said outrigger float axles and disposed therebetween to position said outrigger float axles adjacent the circumference of said wheels; circular rack gears mounted in face-to-face relationship on the inwardly facing portion of said wheels adjacent the circumference thereof; pinion gears mounted on said outrigger float axles and positioned in engagement between said pairs of circular rack gears with said rack gears juxtaposed on opposite sides of the circumference of said pinion gears, said pinion gears having hinged teeth capable of being engaged for rotation of said pinion gears only in one direction thereby causing said pinion gear to be engaged by only the rack gear on one side and to be rotated in one direction thereby when said floats move upward and to be engaged by only the rack gear on the opposite side and to be rotated in the same direction thereby when said floats move downward; variable ratio power transmission means connected between said opinion gears and their respective axles to provide for variation of the rotational speed of said wheels and outrigger floats for any given rate of up and down movement thereof and to allow said wheels and outrigger floats to turn free when desired; honeycombed outer surfaces on said wheels and outrigger floats for gripping the water when said wheels and floats are rotated thus providing propulsion power for said device; water tanks in said supporting floats, wheels and outrigger floats for receiving and dispensing water to change the relative densities thereof; means for filling and emptying water in said water tanks; and an auxiliary power system capable of receiving power from said outrigger floats and wheels for purposes other than propulsion and delivering power to said outrigger floats and wheels from an auxiliary engine when necessary.

11. A device for harnessing kinetic energy in a fluid, comprising: a first member associated with said fluid; a second buoyant member supported by said fluid, said second member being operatively associated with said first member and capable of movement with respect thereto upon activation by motion of said fluid; means interposed between said members for converting said movement into rotary motion of said second member; and means on said second member for transmitting the energy of said rotary motion to said fluid.

12. A device for harnessing kinetic energy in a fluid, comprising: a first member supported by said fluid; a second member supported by said fluid, said second member being operatively associated with said first member and capable of reciprocating movement with respect thereto upon activation by motion of said fluid; means interposed between said first and second members for converting said reciprocating movement into unidirectional rotation of one of said members; means operatively associated with said rotating member for varying the speed of said rotation for any given rate of reciprocation; and means operatively associated with said members for transmitting the energy of said rotation to said fluid to supply propulsive power to said rotating member.

13. A device for harnessing kinetic energy of waves in a liquid, comprising: a buoyant object disposed in said liquid; a float disposed in said liquid, said float operatively associated with said buoyant object and capable of up and down movement with respect thereto in response to the waves of said liquid; means cooperatively interconnecting said object and float for converting said up and down movement into unidirectional rotation of said float; and means associated with said float for transmitting the force of said rotation from said float to said liquid to supply propulsive power for said object.

14. A device for harnessing the waves present on the surface of large bodies of water for propelling a ship, comprising: a ship; a float operatively associated with said ship and capable of up and down movement with respect thereto in response to said waves; rack and gear means interconnecting said ship and float for translating said up and down movement into unidirectional rotation of said float; means on said float for transmitting the force of said rotation to said water to supply propulsive power for said ship; and means on said ship and float for varying the relative densities thereof thus changing said up and down movement.

References Cited in the file of this patent

UNITED STATES PATENTS

| | | |
|---|---|---|
| 630,218 | Hartwell | Aug. 1, 1899 |
| 828,659 | Hutchings | Aug. 14, 1906 |
| 986,740 | Mobius | Mar. 14, 1911 |
| 1,033,476 | Schulze | July 23, 1912 |
| 1,066,896 | Frame | July 8, 1913 |
| 2,783,022 | Solzer | Feb. 26, 1957 |

FOREIGN PATENTS

| | | |
|---|---|---|
| 956 | Great Britain | Mar. 29, 1909 |